United States Patent
Murakami

[11] 3,957,256
[45] May 18, 1976

[54] SCREW EXTRUDER
[75] Inventor: Kenkichi Murakami, Osaka, Japan
[73] Assignee: Kabushiki Kaisha Plastic Kogsku Kenkyusho, Osaka, Japan
[22] Filed: Mar. 26, 1974
[21] Appl. No.: 454,926

[30] Foreign Application Priority Data
Apr. 5, 1973   Japan.............................. 48-39268
Sept. 8, 1973  Japan............................ 48-101404

[52] U.S. Cl............................... 259/193; 259/191
[51] Int. Cl.² ..................... A21C 1/06; B29B 1/10; B29F 3/02
[58] Field of Search ........... 259/193, 185, 191, 192, 259/DIG. 9, DIG. 10, 97; 18/125 A, 125 B, 1

[56] References Cited
UNITED STATES PATENTS

| | | |
|---|---|---|
| 2,453,088 | 11/1948 | Dulmage............................ 259/193 |
| 2,696,635 | 12/1954 | Rehak et al......................... 259/192 |
| 3,300,810 | 1/1967 | Gregory et al...................... 259/191 |
| 3,712,594 | 1/1973 | Schippers......................... 425/208 X |
| 3,756,574 | 9/1973 | Maddock............................ 259/193 |
| 3,780,995 | 12/1973 | Burkle ............................... 259/193 |
| 3,788,614 | 1/1974 | Gregory.............................. 259/191 |

Primary Examiner—Stanley N. Gilreath
Assistant Examiner—Donald B. Massenberg
Attorney, Agent, or Firm—Armstrong, Nikaido, & Wegner

[57] ABSTRACT

A screw extruder having a screw including a plug formed with flutes by which the flow of material existing in the cross section of a screw channel is divided into a plurality of striations. The order of arrangement of inlets of the flutes is different from the order of arrangement of outlets communicating with the inlets with respect to the circumferential direction of the plug, whereby the flow is divided into rearranged striations.

18 Claims, 28 Drawing Figures

SCREW EXTRUDER

SUMMARY OF THE INVENTION

The present invention relates to a novel screw extruder, more particularly to a screw extruder having a screw which includes a plug formed with specified flow passages or flutes for dividing the material to be conveyed into rearranged striations to obtain a homogeneous product.

DESCRIPTION OF THE PRIOR ART

The flow of fluid in the screw channel of a single screw extruder is produced by the relative movement between the screw channel and the inner surface of the cylinder comprising part thereof. Such flow element is known to include a drag flow flowing through the screw channel toward the discharge outlet and a transverse flow element circling in the cross sectional plane of the channel.

When a backpressure is applied to the distal end of the screw in the vicinity of the discharge outlet, a backpressure flow element occurs in the reverse direction relative to the drag flow to elongate the melt in the screw channel and prolong the resident time of the same in the channel, consequently subjecting the material to a more intensive kneading action per unit amount of discharge.

However, it is to be noted that the transverse flow which contributes to the kneading operation is a helical flow which advances while slowly circling in the cross sectional plane of the screw channel and which therefore does not cause the material to move in the cross sectional plane of the screw channel outward from a center portion or inward from an outer portion.

Single screw extruders of the standard type produce strong shear force element along the screw channel but are relatively ineffective in moving the material transversely of the screw channel as stated above. Thus the mixing action, which may take place locally, fails to achieve a satisfactory result throughout the whole material, giving a product which is not fully homogeneous.

Further with single screw extruders of the standard type, the solid material charged therein is melted while being sent toward the direction of extrusion, with the solid material positioned behind the screw flight and the melt in front of the screw flight in a separate manner. Accordingly, even after the solid in the screw channel is reduced with the advance of the material and the material having eventually left the distal end of the screw in entirely molten state, periodic variations are generally found in the temperature and kneading degree of the resulting helically continuous molten material, in corresponding relation to the pitch of the helix.

A highly viscous fluid such as molten plastics flows along the wall of a static device generally in the form of a laminar flow element. The laminar flow has a stream line which remains uncharged in spite of the lapse of time. It therefore follows that although the material is immobile in directions transverse to the stream line. Mixing by the standard-type single screw extruder resembles that achieved by such movement of material in a manner which is known as laminar flow mixing.

Homogeneity in directions transverse to a flow may be improved by dividing the flow in the transverse plane into some tubular flow elements whose surfaces are surrounded by a number of stream lines (hereinafter referred to briefly as "striations") and joining the striations in a rearranged fashion in an order different from the original arrangment of the group of striations. (The latter step is hereinafter referred to as "rearrangement of divided striations".)

The striations described above can be produced by forming their surfaces with a plate, groove, tube, projection or like means placed into the flow and capable of dividing the flow. Extruders employing such means which is stationary are known as disclosed in Japanese Pat. No. 553,918, U.S. Pat. No. 3,404,869 and U.S. Pat. No. 3,583,678.

Among extruders of the type wherein a screw is rotatably housed in a cylinder, some of those having a plurality of screws are adapted to divide a flow into rearranged striations as described above. For example, an extruder having two screws which are not fully in meshing engagement with each other generally has a construction such that the two screws are housed in two cylindrical spaces partly communicating with each other, and the clearances defined by the respective cylindrical inner surfaces and screw flights communicate with each other at the junction of the two cylinders.

Accordingly, by virtue of rotation of the two screws, a portion of the material in one clearance is separated from the main flow in the form of striation by the movement of the flight and passes through the communicating junction to join the flow in the other clearance within the adjacent cylinder. In this way, part of the material in the clearance of one cylinder is separated to join the material in the clearance of the other cylinder, and vice versa. Thus, the extruder effects the rearrangement of divided striations by repeating the division and union of the material conveyed.

Using a mixing apparatus of the stationary cylinder type for the rearrangement of divided striations, an attempt has been made to produce a transverse flow by inclining or twisting the means for generating and guiding the striations in the direction of main flow, but substantial movement of material transverse to the direction of main flow has not been found feasible inasmuch as the above-mentioned means is held stationary.

OBJECTS OF THE INVENTION

The main object of this invention is to provide a single screw extruder having a screw of a special construction for effecting the rearrangement of divided striations to subject the fluid flowing through the screw channel to an overall mixing action and uniform shear and to thereby obtain a homogeneous product.

Other objects will be apparent from the descriptions hereinafter.

BRIEF DESCRIPTION OF THE DRAWINGS

FIGS. 4 (a) to (d) are transverse views illustrating connecting holes formed in the plug of FIG. 2;

FIGS. 5 (a) and (b) are transverse views showing the relationship between inlets and outlets communicating therewith through the connecting holes formed in the plug of FIG. 2;

FIGS. 9 (a), (b) and (c) are transverse views showing connecting holes formed in the plug of FIG. 8;

FIGS. 10 (a) and (b) are transverse views showing the relationship between inlets and outlets communicating therewith through the connecting holes formed in the plug of FIG. 8;

FIGS. 12 (a), (b) and (c) are transverse views showing connecting holes formed in the plug of FIG. 11;

FIGS. 13 (a) and (b) are transverse views showing the relationship between inlets and outlets communicating therewith through the connecting holes formed in the plug of FIG. 11;

FIGS. 15 (a) and (b) are transverse views showing connecting holes formed in the plug of FIG. 14; and FIGS. 16 (a) and (b) are transverse views showing the relationship between inlets and outlets communicating therewith through the connecting holes formed in the plug of FIG. 14.

DETAILED DESCRIPTION OF THE INVENTION

According to the present invention, the flow of material in the cross sectional plane of a screw channel is divided into a plurality of striations by flow passages or flutes formed in a portion of the screw, namely in a plug located therein. The divided striations are rearranged in a different order and then joined together subsequently between the rotating screw and the inner surface of a fixed cylinder while being subjected to a strong shearing action transverse to the flow of material in the striations. Consequently, not only are the striations rearranged in an order different from the original arrangement of striations before the flow is divided, but the component striations are also deformed by being markedly stretched in the circumferential direction of the screw. With these features, the present extruder achieves an outstanding mixing effect as compared with mixers of the stationary cylinder type adapted for the rearrangement of divided striations.

Furthermore according to the present invention, the flow of material from the screw channel is divided into striations in the circumferential direction of the screw, so that the instant extruder is most effective in eliminating the nonhomogeneity of material heretofore observed in the cross sectional plane of screw channels, circumferentially of the screw.

Inasmuch as the striation passes through a connecting hole, the direction of the striation is reversed radially relative to the screw axis to thereby eliminate nonhomogeneity to be otherwise found in the cross sectional plane of the screw in radial directions.

The present invention will be described below with reference to the accompanying drawings showing embodiments.

Figure 1:
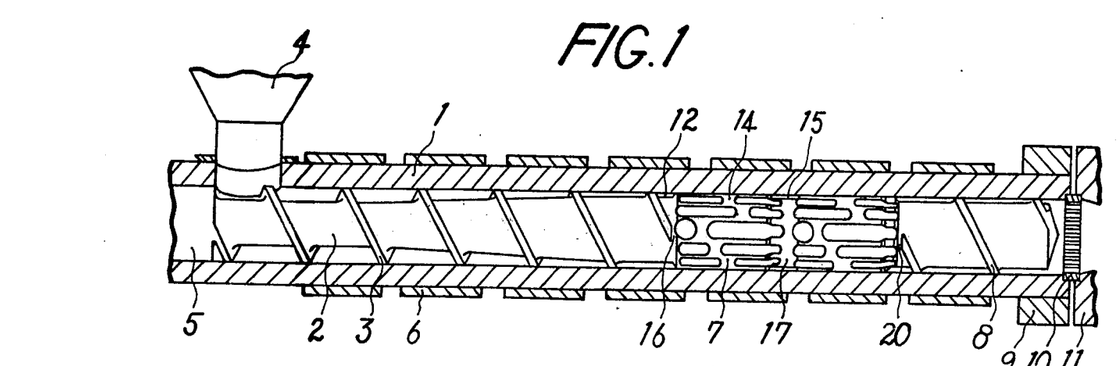
FIG. 1 is a view in vertical section showing an embodiment of the screw extruder of the present invention.

FIG. 1 shows a cylinder 1 and a screw 2 housed therein and formed with a screw flight 3. A material supplied from a hopper 4 is sent toward the distal end of the screw by the rotation of the screw.

Unillustrated drive means on the left-hand side of FIG. 1 is coupled to the rear portion 5 of the screw to rotate the screw. Band heaters 6 covering the outer surface of the cylinder heat and fluidize the material in the cylinder.

A plug 7 provided in an intermediate or end portion of the screw 2 has means for effecting the rearrangement of divided striations and a circumferentially continuous leakproof portion 14 formed on at least one part of the plug 7, with only a small clearance provided between the outer periphery of the portion 14 and the inner surface of the cylinder, so as to prevent marked leakage of the conveyed fluid from between the outer surface of the plug 7 and the cylinder inner surface.

Disposed in front of the distal end of the screw 2 is a breaker plate 10 which is fixed to a die head 9 by an adapter 11. The material supplied from the hopper 4 is sent forward by the screw flight, while being heated by the band heaters 6 and thereby given increasing fluidity, and mixed by the plug 7. The material is thereafter sent further forward by a front screw flight 8, regulated by the breaker plate 10 and then discharged toward the adapter 11.

Although the embodiment of FIG. 1 includes two plugs 7 connected together in series, only one plug or, alternatively, more than two plugs are employable. The front screw flight 8 need not necessarily be provided, or it may be disposed between a plurality of plugs.

The construction of the plug 7 will be described in detail with reference to FIG. 2, which shows the screw flight 3 and a space 12 positioned upstream of the leakproof portion. The space may be such that the screw flight 3 is connected to the plug 7, but a cutout 16, when provided to terminate the flight, renders the flow of fluid more uniform in the circumferential direction of the screw.

The plug 7 is formed with inlet flutes 18 and outlet flutes 19 in its outer periphery. According to this embodiment, the inlet flutes 18 and outlet flutes 19 are in the shape of grooves formed in the peripheral surface of the plug 7. Alternatively, they may be replaced by bores. The number of the grooves need not necessarily be equal to the number of connecting holes 13.

Since the inlet flutes 18 and outlet flutes 19 serve as auxiliary flow passages to facilitate the arrangement of the connecting holes, some or all of the partition walls between the grooves can be eliminated. If an increased number of inlet flutes are provided which are equal to the connecting holes 13 in number, the inlets of the inlet flutes will then act to divide the flow into striations upstream of the leakproof portion. Likewise, the outlets of the outlet flutes serve to join the striations to form a flow downstream of the leakproof portion.

Figure 2:
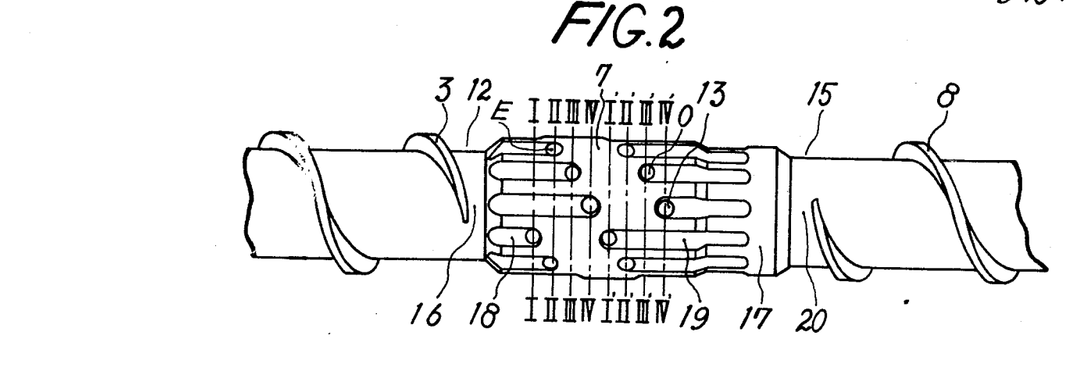
FIG. 2 is a side elevation showing a plug.
Figure 3:
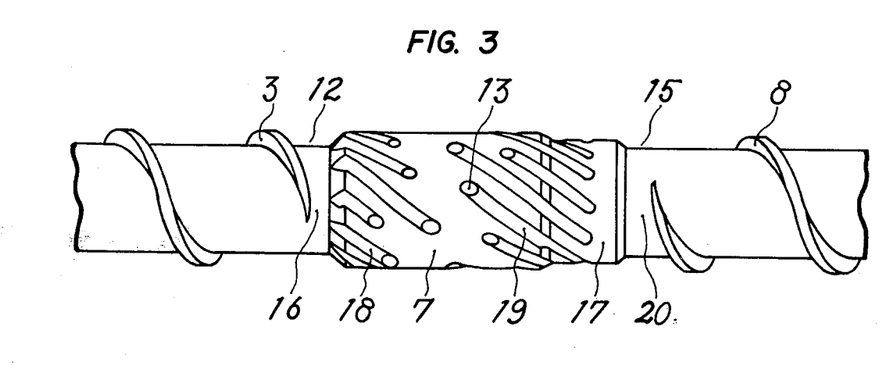
FIG. 3 is a side elevation showing another embodiment of plug.
Figure 4A:
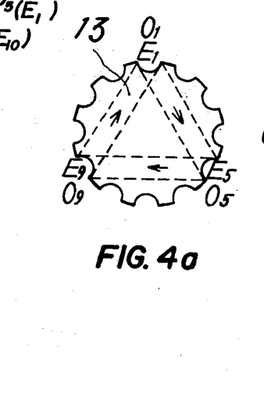
Figure 4B:
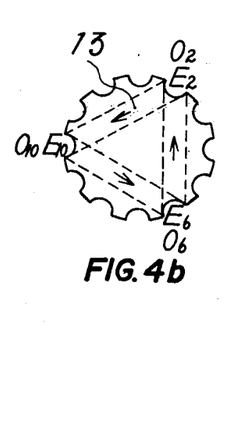
Figure 4C:
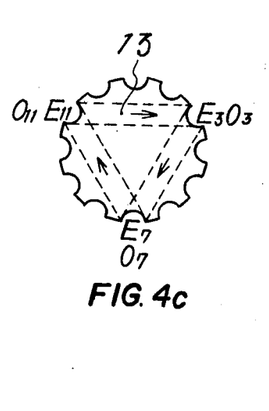
Figure 4D:
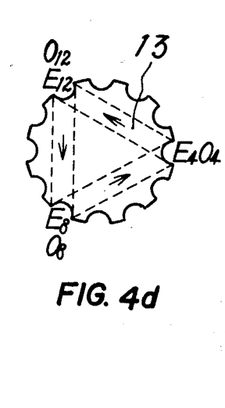

The inlet flutes 18 and outlet flutes 19 in the embodiment of FIG. 2 are both positioned in parallel to the screw axis, but they need not necessarily be so positioned. FIG. 3 shows the inlet flutes 18 and outlet flutes 19 formed in the peripheral surface of the plug 7 as helical grooves.

According to the embodiment of FIG. 3, the helical grooves are twisted in the same direction as the twist of the screw flight, with the result that the rotation of the screw causes the grooves to impart a drag force to the fluid. Alternatively, the grooves may be twisted in a reverse direction to the twist of the screw flight.

The outlets of the inlet flutes 18 and the inlets of the outlet flutes 19 are inlets E and outlets O of the connecting holes 13, respectively. As seen in FIG. 2, these openings are not located at the same positions in the axial direction. For instance, the inlets E of the connecting holes 13, although arranged equidistantly circumferentially of the plug 7, are classified into four groups with respect to their positions in the direction of the screw axis, namely those positioned on a plane I—I at right angle to the axis, those positioned on a similar plane II—II, those positioned on another similar plane III—III and those positioned on still another similar plane IV—IV.

Similarly, the outlets O of the connecting holes 13 are divided, with respect to their positions, into four groups respectively positioned on planes I'—I' to IV'—IV' at right angle to the axis of the screw.

According to this embodiment, the connecting holes 13 with inlets E located in the plane I—I have their outlets O positioned in the plane I'—I'. Similarly, the other inlets E and outlets O of connecting holes 13 are positioned on the planes II—II and II'—II', on the planes III—III and III'—III', and on the planes IV—IV and IV'—IV', respectively.

Figure 5A:
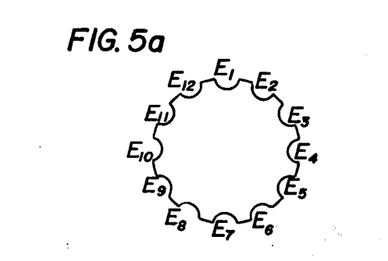
Figure 5B:
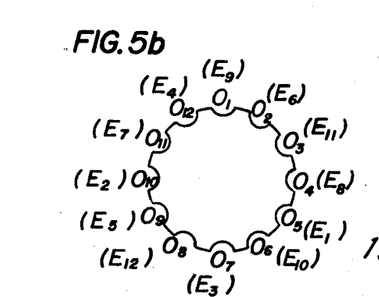

FIGS. 5 (a) and 5 (b) show the connecting holes 13 as arranged transversely of the screw. It is seen in FIG. 5 (a) that the inlets E of the connecting holes 13 are arranged in the periphery of the plug 7 as indicated at $E_1, E_2, \ldots E_{12}$. The outlets O of the connecting holes 13 are similarly arranged as indicated at $O_1, O_2, \ldots O_{12}$ in FIG. 5 (b).

FIG. 4 (a) shows the connecting holes 13 interconnecting the inlets E positioned on the plane I—I and the outlets O positioned on the plane I'—I' as seen transversely of the screw. Likewise, FIGS. 4 (b), (c) and (d) show the arrangements of the connecting holes 13 having inlets E and outlets O positioned on the planes II—II and II'—II', on the planes III—III and III'—III', on the planes IV—IV and IV'—IV', respectively.

The arrows in FIG. 4 (a) indicate the directions of fluid flowing through the connecting holes. For instance, the fluid admitted into the connecting hole 13 from the inlet $E_1$ flows toward the outlet $O_5$, while the fluid flowing in from the inlet $E_5$ flows toward the outlet $O_9$. The fluid enters the inlet $E_9$ and flows toward the outlet $O_1$.

It is seen from above that the order of arrangement of the outlets O on the circumference of the plug is different from the order of arrangement of the inlets E communicating with the outlets by way of the connecting holes as will be apparent from FIG. 5 (b), in which the reference characters in each pair of parentheses indicate the position of the inlet communicating with the particular outlet of the connecting hole.

In this way, the component striations adjoining one another immediately before entry into the connecting holes 13 can be rearranged in a greatly different order upon passing through the connecting holes.

According to this embodiment, the connecting hole 13 as projected on a plane perpendicular to the screw axis is positioned at an angle of 30° with respect to the line connecting the center of the inlet of the hole and the axis, but the angle is not necessarily limited to 30°. If the angle is almost 0°, the rearrangement of divided striations achieved is such that adjoining striations before division will be brought close to each other, this making it less likely to effect satisfactory overall movement of the material, namely satisfactory mixing through the rearrangement of divided striations. However while the fluid flows through the inlet flute 18, connecting hole 13 and outlet flute 19, the direction of the striation is reversed radially of the screw, with the result that a portion of fluid flowing in the vicinity of the bottom of the screw channel shifts toward the inner surface of cylinder, whereas another portion of the fluid flowing along the inner surface of cylinder shifts toward the bottom of the screw channel, one portion thus being replaced by the other. (The shift of fluid thus effected will hereinafter be referred to briefly as "reversion".)

If the above-mentioned angle of the connecting hole 13 is 0°, the angle of reversion will be 180°. As the angle of the connecting hole 13 increases, the angle of reversion decreases from 180°. However, if a plurality of plugs are provided to repeatedly effect such reversion a plurality of times, the directional arrangement of the striations in the radial direction of the screw will be changed every time reversion takes place, thereby eliminating directional unevenness of heat and shear given to the striations to assure improved homogeneity. In view of the foregoing conditions and to facilitate machining, the angle of the connecting hole is preferably 5° to 45°.

Figure 6:
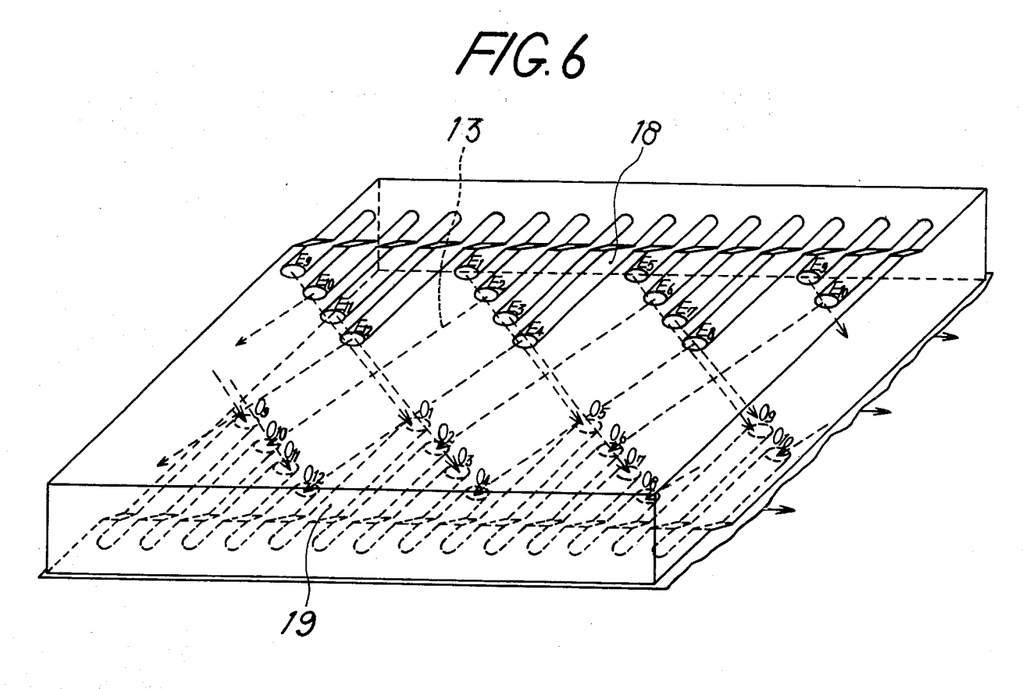
FIG. 6 is a perspective view of the plug showing its outer periphery as developed in a plane.

FIG. 6 shows the outer periphery of the plug 7 as developed in the form of a plane in which the connecting holes extending through the screw are shown as holes extending through a planar plate. This figure shows the inlet flutes 18 and inlets $E_1, E_2, \ldots E_{12}$ of the holes 13 in the upper surface of the planar plate. The connecting holes 13 penetrating through the plate are indicated in dotted lines and directions of flows, by the arrows. The outlets $O_1, O_2, \ldots O_{12}$ of the holes 13 and outlet flutes 19 are in the rear surface of the plate.

On the outlet flute side, the inner surface of cylinder is supposedly in the form of a planar surface which is positioned further to the rear of the rear surface of the plate and spaced apart therefrom by a small distance. The planar surface moves in the direction of the arrows relative to the rear surface of the planar plate.

A space 15 is provided downstream of the plug 7. In this portion, the striations from the outlet flutes 19 join together, while being subjected, between the cylinder inner surface and the outer surface of a column-like portion 17, to a strong shear force acting transversely of the direction of outflow of the fluid. As a result, the component striations are markedly stretched circumferentially relative to the screw and thereby deformed.

The dimension of the space between the outer surface of the column-like portion 17 and the cylinder inner surface is suitably determined to provide an optimum shear force to the fluid in accordance with the kind of the material used and the preceding and following processes.

The outlet flutes 19 of this embodiment extend to an intermediate point of the column-like portion 17 to cause the fluid to flow into the downstream space 15 from the inner grooved surface of the column-like portion 17. Thus, the divided striations are forced out progressively from zones having a certain axial length and into the downstream space 15 and are thereby joined together.

Thus, the fluid from the supply openings can be collected in such manner that the striations having relatively large surface areas are joined together, because the openings for supplying the fluid, i.e. the extensions of the outlet flutes 19, are formed in the outer periphery of the column-like portion 17 at substantially equal spacing, and the fluid is supplied to the space 15 continuously.

Provided further downstream of the column-like portion 17 is the front screw flight 8, which may be connected to the portion 17. Alternatively, the connected end is cut away at 20.

The present invention will further be described below with reference to the drawings showing another embodiment.

Figure 7:
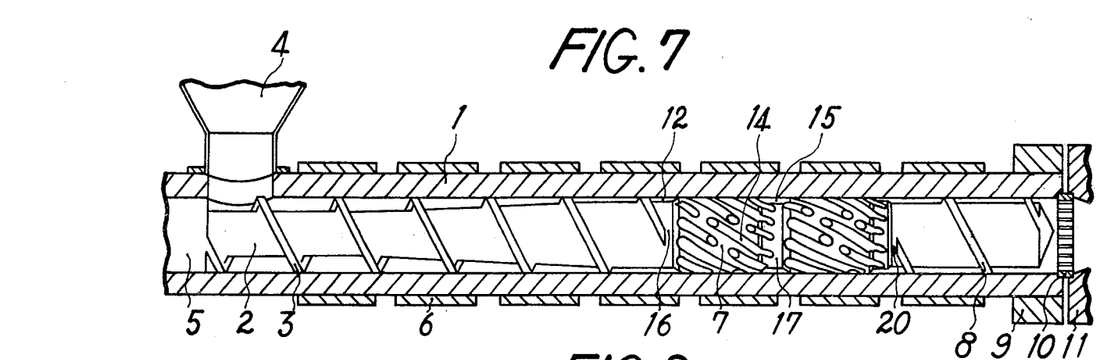
FIG. 7 is a view in vertical section showing another embodiment of the screw extruder of the present invention.

FIG. 7 shows a cylinder 1 and a screw 2 housed therein and formed with a screw flight 3. A material supplied from a hopper 4 is sent toward the distal end of the screw by the rotation of the screw.

Unillustrated drive means on the left-hand side of FIG. 7 is coupled to the rear portion 5 of the screw to rotate the screw. Band heaters 6 covering the outer surface of the cylinder heat and fluidize the material in the cylinder.

A plug 7 provided in an intermediate or end portion of the screw 2 has guide grooves 14 and means for mixing the material by the rearrangement of divided striations.

Disposed in front of the distal end of the screw 2 is a breaker plate 10 which is fixed to a die head 9 by an adapter 11. The material supplied from the hopper 4 is sent forward by the screw flight 3, while being heated by the band heaters 6 and thereby given increasing fluidity, and mixed by the plug 7. The material is thereafter sent further forward by a front screw flight 8, regulated by the breaker plate 10 and then discharged toward the adapter 11.

Although the embodiment of FIG. 7 includes two plugs 7 connected together in series, only one plug or, alternatively, more than two plugs are employable. The front screw flight 8 need not necessarily be provided, or it may be disposed between a plurality of plugs.

The construction of the plug 7 will be described in detail with reference to FIG. 8, which shows the screw flight 3 and a space 12 positioned upstream of the plug 7. The space may be such that the screw flight 3 is connected to the plug 7. Alternatively, the connected end of the flight may be cut away as at cutout 16 to render the flow of fluid more uniform in the circumferential direction of the screw.

The plug 7 is formed, in its cuter periphery, with a plurality of guide grooves 14 which are divided into inlet flutes 18 and outlet flutes 19. All the grooves in this embodiment including both inlet flutes 18 and outlet flutes 19 are not arranged at an equal angle on the circumference. They are classified into several groups, e.g. into three groups in the instant embodiment. The grooves need not necessarily be equal in number to the number of the connecting holes 13. For example, the partition walls of the grooves belonging to the same group can be eliminated to form a single, large groove.

The guide grooves 14 not only divide a flow into striations but also impart a drag force to the fluid in the grooves, since they are twisted in the same direction as the screw flight 3.

The terminal ends of the inlet flutes 18 and the starting ends of the outlet flutes 19 are inlets E and outlets O of the connecting holes 13, respectively. As seen in FIG. 8, these openings are not located at the same positions in the axial direction. For instance, although the inlets E of the connecting holes 13 are formed in the periphery of the plug 7, the connecting holes 13 are classified into three groups with respect to their positions in the direction of the screw axis, namely those starting from a plane I—I at right angles to the axis and terminating on a plane II—II, those starting from the plane II—II and terminating on a plane III—III, and those starting from the plane III—III and terminating on a plane IV—IV.

Figures 10A, 10B:
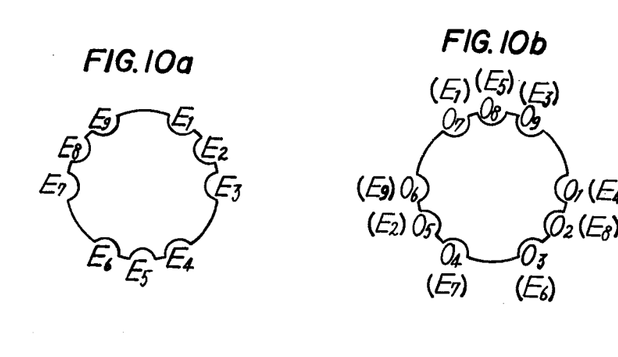

FIGS. 10 (a) and 10 (b) show the arrangement of the inlet flutes 18 and outlet flutes 19 in section transverse to the screw axis. The terminal ends of the inlet flutes 18, namely the inlets E of the connecting holes 13 are arranged along the circumference of the plug 7 as indicated at $E_1$, $E_2$, ... $E_9$ as illustrated in FIG. 10 (a). The starting ends of the outlet flutes 19, namely the outlet O of the connecting holes 13 are arranged as indicated at $O_1$, $O_2$, ... $O_9$ as shown in FIG. 10 (b).

Figure 9A:
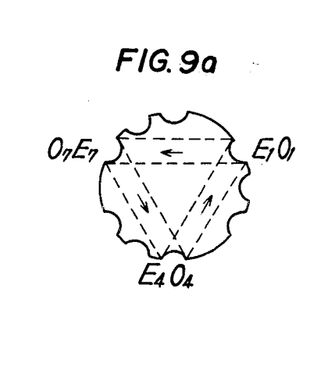
Figure 9B:
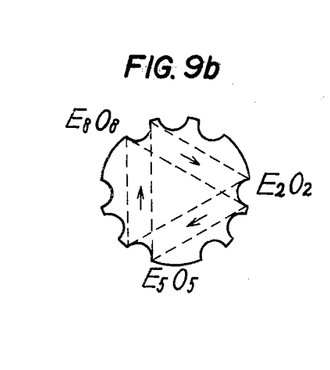
Figure 9C:
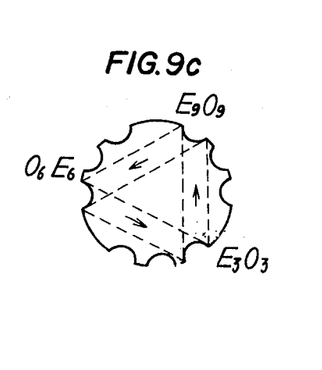

FIG. 9 (a) shows the connecting holes 13 interconnecting the inlets E on the plane I—I and the outlets O on the plane II—II as arranged transversely of the screw. Likewise, FIGS. 9 (b) and (c) show the arrangements of the connecting holes 13 having inlets E and outlets O on the planes of II—II and III—III, and on the planes of III—III and IV—IV, respectively.

The arrows in FIG. 9 (a) indicate the directions of fluid flowing through the connecting holes. For instance, the fluid admitted into the connecting hole 13 from the inlet $E_1$ flows toward the outlet $O_7$, the fluid flowing in from the inlet $E_7$ flows toward the outlet $O_4$, and the fluid entering from the inlet $E_4$ flows toward the outlet $O_1$.

It is seen from above that the order of arrangement of the inlets of the guide grooves on the circumference of the plug is different from the order of arrangement of the outlets of the guide grooves communicating with the inlets by way of the connecting holes as will be apparent from FIG. 10 (b), in which the reference characters in each pair of parentheses indicate the position of the inlet communicating with the particular outlet of the connecting hole.

Figure 8:
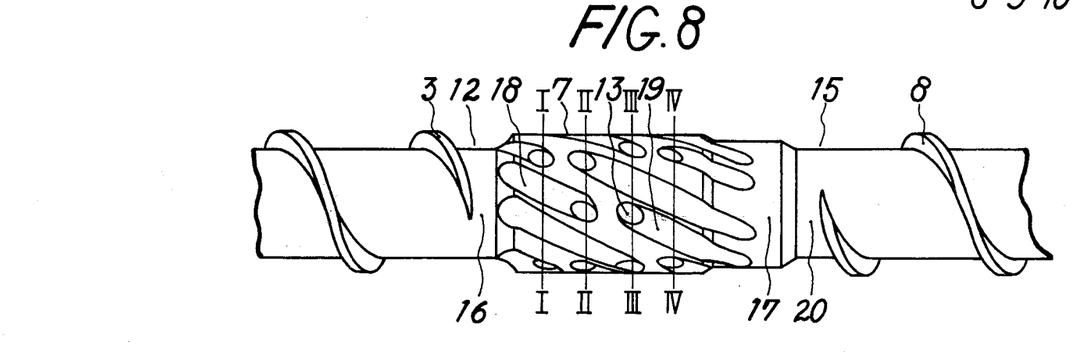
FIG. 8 is a side elevation showing a plug.

With the embodiment of FIG. 8, the terminal end of the inlet flute, namely the inlet of the connecting hole, and the starting end of the outlet flute, namely the outlet of the connecting hole, are arranged in parallel to the screw axis, whereas each of the inlet flute 18 and outlet flutes 19 is in the form of a helical groove at a twist angle with respect to the axis of the screw, so that the helical inlet flute and the helical outlet flute, as arranged in the space, are generally deviated from each other on the helical coordinates.

With this embodiment, the connecting hole 13 as projected on a plane perpendicular to the screw axis lies at the same angle with the line connecting the center of inlet of the hole and the screw axis, irrespective of whether the fluid flows through the connecting holes in a clockwise direction as seen in FIG. 9 (b) or in a counterclockwise direction as seen in FIGS. 9 (a) and 9 (b) toward the direction of advance of the fluid on the screw. Where the inlet flutes and outlets flutes on the circumference are divided into three groups, the abovementioned angle can be set at the same value of 30°. However, the angle which is set at 30° in this embodiment is not necessarily limited to 30°.

While the fluid flows through the inlet flute 18, connecting hole 13 and outlet flute 19, the direction of the striation is reversed radially of the screw, with the result that a portion of fluid flowing in the vicinity of the bottom of the screw channel shifts toward the inner surface of the cylinder, whereas another portion of the fluid flowing along the inner surface of cylinder shifts toward the bottom of screw channel, one portion thus being replaced by the other.

Figure 11:
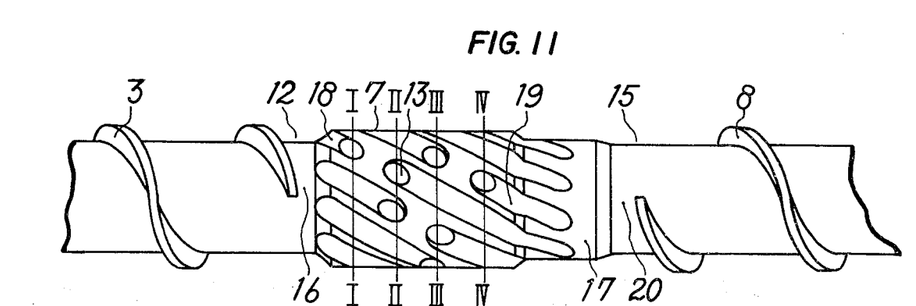
FIG. 11 is a side elevation showing another embodiment of plug.

FIG. 11 shows an embodiment in which the outlet flute is positioned on the extension of a helical line on which the inlet flute is located. In that case, the terminal end of the inlet flute, namely the inlet E of the connecting hole, and the starting end of the outlet flute, namely the outlet O of the connecting hole, are displaced from each other in the peripheral surface of the plug in the direction of twist of the helical line, in accordance with the twist angle of the helical line and the axial distance between the inlet E and outlet O.

Figure 12A:
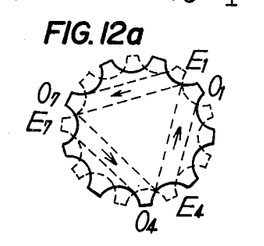

FIG. 12 (a) shows the positions of guide grooves on a plane I—I in solid line, the position of those on a plane II—II in one broken line, and the arrangement of connecting holes 13 interconnecting the inlets E on the plane I—I and the outlets O on the plane II—II in another broken line as seen in a transverse section of the screw.

Figure 12B:
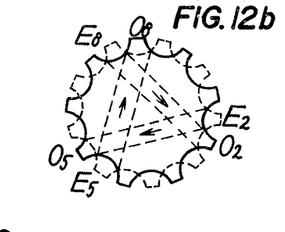
Figure 12C:
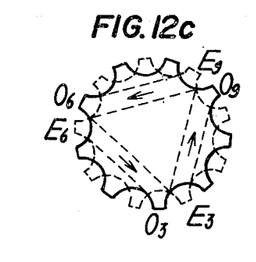

Likewise, FIGS. 12 (b) and 12 (c) show the positions of guide grooves and the arrangement of the connecting holes in the case where the inlets E and outlets O thereof are positioned on the planes II—II and III—III and on the planes III—III and IV—IV, respectively.

The arrows in FIGS. 12 indicate the directions of fluid flowing through the connecting holes 13 as in FIG. 9. The fluid admitted into the connecting hole 13 from the inlet $E_1$ flows toward the outlet $O_7$, the fluid flowing in from the inlet $E_7$ flows toward the outlet $O_4$, and the fluid entering from the inlet $E_4$ flows toward the outlet $O_1$.

Even if the connecting holes are in the same arrangement as in the embodiment of FIGS. 8 to 10, the connecting hole 13 of this embodiment as projected on a plane perpendicular to the screw axis lies at an angle of less than 30° with the line connecting the center of the inlet E of the hole and the screw axis if the fluid on the screw flows through the connecting holes in a clockwise direction as seen in FIG. 12 (b), or at an angle of more than 30° if the fluid flows in a counterclockwise direction as seen in FIGS. 12 (a) and 12 (c), provided that the grooves are twisted rightward.

Figure 13A:
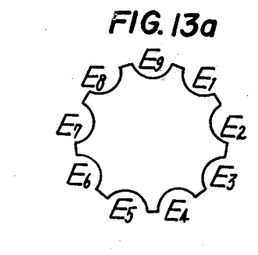
Figure 13B:
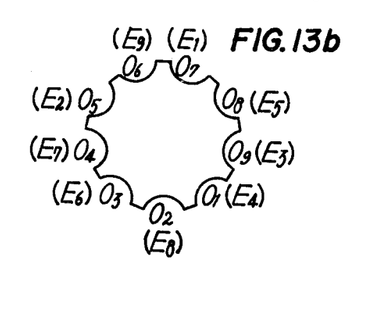

With the foregoing construction, the order of arrangement of the inlets of the guide grooves on the circumference of the plug is made different from the order of arrangement of the outlets of the guide grooves communicating with the outlets by way of the connecting holes as will be apparent from FIG. 13 (b), in which the reference characters in each pair of parentheses indicate the position of the inlet communicating with the particular outlet of the connecting hole.

Figure 14:
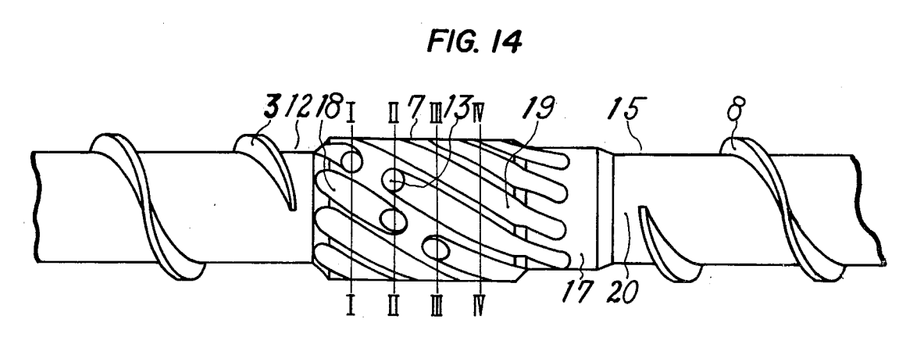
FIG. 14 is a side elevation showing another embodiment of plug.

FIG. 14 shows an embodiment which includes undivided guide grooves and guide grooves divided into inlet flutes and outlet flutes. Although this embodiment is similar to the embodiment of FIGS. 11 to 13 in the arrangement of guide grooves and connecting holes, only six of the nine guide grooves in the peripheral surface of plug are divided into inlet flutes and outlet flutes, while the other three guide grooves lie continuously in an undivided form from a space upstream of the plug to a downstream space.

As in the embodiment of FIGS. 11 to 13, the divided guide grooves include terminal ends of inlet flutes and starting ends of outlet flutes which are interconnected by connecting holes.

Figure 15A:
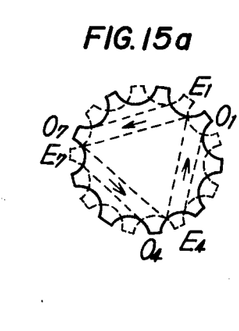
Figure 15B:
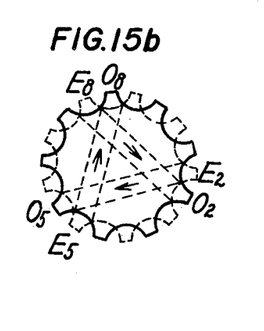
Figure 16A:
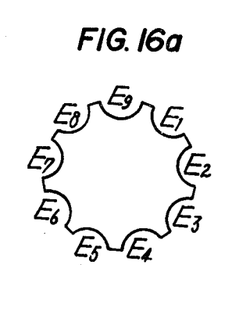

Like FIGS. 9 or 12, the arrows in FIGS. 15 indicate the directions of flow of the fluid through the connecting holes 13.

It is seen from above that the order of arrangement of the inlets of the guide grooves on the circumference of the plug is different from the order of arrangement of the outlets of the guide groove communicating with the outlets by way of the connecting holes.

In this way, the component striations adjoining immediately before entry into inlets of the guide grooves can be rearranged in a greatly different order upon passing through the guide grooves.

The outlet flutes 19 of this embodiment extend to an intermediate point of the column-like portion 17 to cause the fluid to flow into the downstream space 15 from the inner grooved surface of the column-like portion 17. Thus, from zones having certain axial length, the divided striations are forced out progressively into the downstream space 15 and are thereby joined together.

Thus, the fluid from the supply openings can be collected in such a manner that the striations having relatively large surface areas are joined together, because the openings for supplying the fluid, i.e. the extensions of the outlet flutes 19, are formed in the outer periphery of the column-like portion 17 at substantially equal spacing, and the fluid is supplied to the space 15 continuously.

Provided further downstream of the column-like portion 17 is the front screw flight 8, which may be connected to the portion 17. Alternatively, the connected end is cut away as at cutout 20.

As described in detail above, the extruder of the present invention has the following advantages:

1. The combination of mixing by the rearrangement of divided striations and laminar flow mixing inherent to single screw extruders produces a synergic effect derived from the advantages of both mixing methods to assure a very uniform, satisfactory mixing operation.

2. As compared with the type wherein means for mixing by the rearrangement of divided striations is incorporated in a single screw extruder as by forming grooves in the inner surface of the cylinder, the present invention requires machining of the screw only and the extruder is therefore easy to make. The screw can be machined with ease only by drilling and groove cutting.

3. Unlike a conventional single screw extruder of the barrier type, the fluid passage does not include a portion of extremely reduced section, so that the instant extruder involves small resistance in the fluid movement and ensures efficient extrusion.

4. Although the instant apparatus is adapted to divide the flow of material as in a screw extruder of the type wherein the flow is divided by projections formed on the bottom of the screw channel, the invention achieves more effective overall movement of material than in the case where divided striations are joined again in an arrangement resembling the original arrangement.

5. Whereas a pressure drop is experienced due to flow resistance in the case of static mixers adapted for the rearrangement of divided striations, the twisted grooves according to the present invention add to the drag force to give an increased pressure.

What is claimed is:

1. A screw extruder comprising a screw having a screw flight for conveying a fluid and rotatably housed in a cylinder, at least one plug installed in a portion of the screw and a circumferentially continuous leakproof portion formed on at least one part of the plug with only a small clearance provided between the outer periphery of the leakproof portion and the inner surface of the cylinder, the plug being formed with a plurality of through connecting holes therein, interconnecting a space upstream of the leakproof portion and another space downstream thereof, with said connecting holes having inlet and outlet portions in the form of a plurality of auxiliary inlet flow passages circumferentially arranged in a definite order on a part of the leakproof portion of said plug and a plurality of corresponding auxiliary outlet passages circumferentially arranged on another part of the leakproof portion of said plug spaced downstream of said inlet flow passages on said plug, wherein the order of arrangement of the inlets of each of the connecting holes is different from the order of arrangement of the corresponding outlets designed to communicate with said inlets sequentially in a circumferential direction about said screw plug.

2. The screw extruder as set forth in claim 1 wherein the plug has inlet flutes and outlet flutes which serve as the auxiliary flow passages to facilitate the arrangement of the connecting holes.

3. The screw extruder as set forth in claim 2 wherein the inlet flutes and the outlet flutes are in the shape of grooves formed in the circumferential surface of the plug.

4. The screw extruder as set forth in claim 2 wherein the inlet flutes and the outlet flutes are in the shape of bores formed in the plug.

5. The screw extruder as set forth in claim 2 wherein the inlet flutes and the outlet flutes are in parallel to the screw axis.

6. The screw extruder as set forth in claim 2 wherein the inlet flutes and the outlet flutes are not in parallel to the screw axis.

7. The screw extruder as set forth in claim 2 wherein the inlet flutes and the outlet flutes are in the shape of helical grooves formed in the circumferential surface of the plug.

8. The screw extruder as set forth in claim 7 wherein the helical grooves are twisted in the same direction as the twist of the screw flight.

9. The screw extruder as set forth in claim 7 wherein the helical grooves are twisted in the reverse direction to the twist of the screw flight.

10. The screw extruder as set forth in claim 1 wherein a column-like portion is provided at the downstream end of the plug to form a circumferentially continuous small space between the inner surface of the cylinder and the outer peripheral surface of the column-like portion.

11. The screw extruder as set forth in claim 1 wherein the screw flight is connected to the plug.

12. The screw extruder as set forth in claim 1 wherein a cutout is formed between the screw flight and the plug.

13. The screw extruder as set forth in claim 1 wherein the plug is formed with a plurality of guide grooves twisted in the same direction as the screw flight, at least one of the guide grooves being divided into an inlet flute and an outlet flute, the terminal end of the inlet flute and the starting end of the outlet flute being interconnected by the connecting hole.

14. The screw extruder as set forth in claim 13 wherein the screw flight is connected to the plug.

15. The screw extruder as set forth in claim 13 wherein a cutout is formed between the screw flight and the plug.

16. The screw extruder as set forth in claim 13 wherein the terminal end of the connecting hole is positioned downstream of the starting end of the connecting hole in the axial direction of the screw.

17. The screw extruder as set forth in claim 13 wherein the starting end and terminal end of the connecting hole are arranged in parallel to the screw axis.

18. The screw extruder as set forth in claim 13 wherein the outlet flute is positioned on the extension of a helical line on which the inlet flute is formed.

* * * * *